I. Holliday,
Circular Saw Guard
No. 93,716. Patented Aug. 17, 1869.
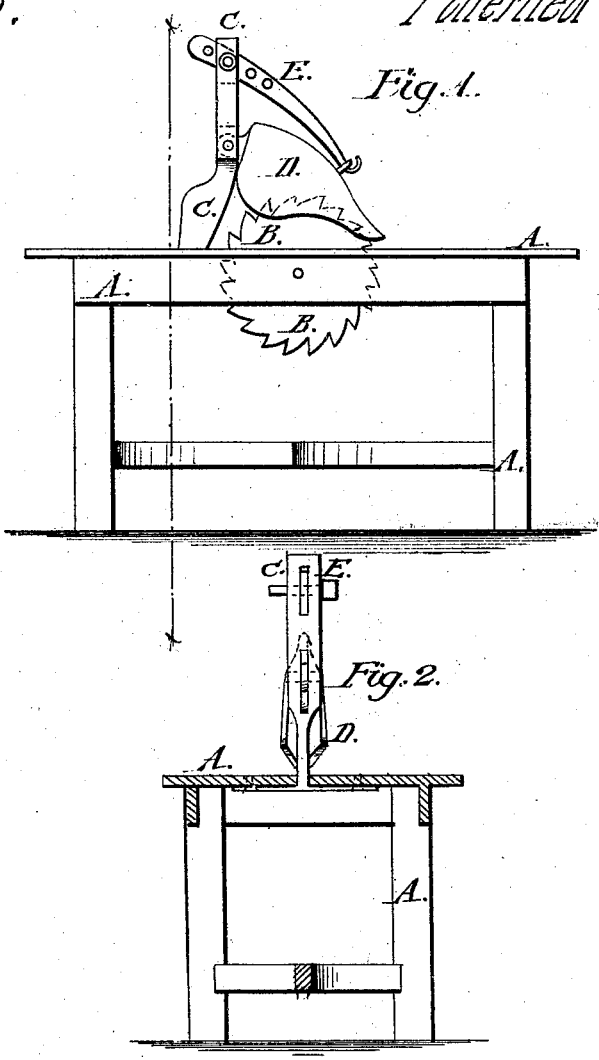
Witnesses:
A. W. Hungrist
O. Hinchman
Inventor:
I. Holliday
per Munn & Co
attorneys

United States Patent Office.

ISAAC HOLLIDAY, OF SOUTH BROOKLYN, NEW YORK, ASSIGNOR TO HIMSELF AND J. S. DEAN, OF SAME PLACE.

Letters Patent No. 93,716, dated August 17, 1869.

IMPROVEMENT IN GUARD FOR CIRCULAR SAWS.

The Schedule referred to in these Letters Patent and making part of the same.

*To all whom it may concern:*

Be it known that I, ISAAC HOLLIDAY, of South Brooklyn, Kings county, New York, have invented a new and improved Guard for Circular Saws; and I do hereby declare that the following is a full, clear, and exact description thereof, which will enable others skilled in the art to make and use the same, reference being had to the accompanying drawings, forming part of this specification, in which—

Figure 1 is a side view of my improved guard, as attached to a circular saw.

Figure 2 is a rear view of the same, partly in section, through the line $x\, x$, fig. 1.

Similar letters of reference indicate corresponding parts.

My invention has for its object to furnish a simple and convenient device, by means of which the upper or exposed part of a circular saw may be covered in such a way as not to interfere with the operation of the saw, while preventing anything from coming in contact with and being injured by or injuring the said saw; and It consists in the shield, hood, or guard, supporting-arm, and adjusting-lever, in combination with each other, when used in connection with a circular saw, as hereinafter more fully described.

A represents the saw-table.

B is a circular saw, which is constructed, hung, and operated in the ordinary manner.

C is an arm, which passes up through the rear part of the slot in the table A, in which the saw B works.

Upon the lower end of the arm C is formed, or to it is attached, a cross-head, $c'$, by means of which the said arm C is secured to the said table A.

The arm C may extend up vertically, or may be made curved, to conform somewhat to the curve of the saw B, as shown in fig. 1.

The arm C should be made of about the same thickness as the plate of the saw B, the set of the saw-teeth making the kerf of such a width as to receive the arm C freely.

D is the guard, shield, or hood, which covers the upper part of the saw B, as shown in figs. 1 and 2.

The upper or rear end of the guard D is hinged or pivoted to the middle part of the arm C, as shown in figs. 1 and 2, and is so formed as to cover the upper or exposed part of the saw above the timber being sawed, so that it may prevent anything from coming in contact with the teeth of said saw, and being injured thereby, or injuring or breaking the teeth of the said saw.

E is an arm or lever, the forward end of which is pivoted or hinged to the guard or shield D, and its rear end passes through a slot in the upper part of the arm C, where it is adjustably secured in place, by a pin passing through the upper part of the said arm C, and through one or the other of the holes through the rear part of the arm or lever E, so that the shield, guard, or hood D, may be conveniently raised or lowered as required, to uncover the upper part of the saw, or to adjust the said guard according to the thickness of the timber to be sawed.

Having thus described my invention,

What I claim as new, and desire to secure by Letters Patent, is—

The hood D, pivoted to the upright C, when said hood embraces the upper portion of the saw, and is adapted for adjustment with relation thereto, by means of the supporting-bar E, all arranged as described, for the purpose specified.

The above specification of my invention signed by me, this 23d day of March, 1869.

ISAAC HOLLIDAY.

Witnesses:
FRANK BLOCKLEY,
JAMES T. GRAHAM.